United States Patent [19]

Cotey

[11] 4,328,639
[45] May 11, 1982

[54] VISCOUS FLUID DAMPING SYSTEM

[76] Inventor: John Cotey, 27 W. End Ave., Haddonfield, N.J. 08033

[21] Appl. No.: 97,945

[22] Filed: Nov. 27, 1979

[51] Int. Cl.³ .................. A63H 3/40; G01D 11/12; F16D 57/00
[52] U.S. Cl. .................. 46/169 A; 46/167; 73/430; 188/322.5
[58] Field of Search .............. 46/169 R, 169 A, 167, 46/166, 165, 168, 169 B, 170; 74/573 F, 574; 73/430, 522, 526; 324/125; 33/346, 327; 188/276, 1 B

[56] References Cited

U.S. PATENT DOCUMENTS

| | | | |
|---|---|---|---|
| 2,529,240 | 11/1950 | Barrows | 46/169 R |
| 2,779,442 | 1/1957 | Bacon | 324/125 X |
| 2,883,794 | 4/1959 | Ellman | 46/196 R X |
| 2,963,818 | 12/1960 | Brudney | 46/169 A |
| 3,102,233 | 8/1963 | Charbonneaux | 73/430 X |
| 3,160,237 | 12/1964 | Reason et al. | 73/430 |
| 3,196,692 | 7/1965 | Jensen | 73/430 X |
| 3,494,203 | 2/1970 | Efimenko et al. | 73/430 |

FOREIGN PATENT DOCUMENTS 1024939  4/1953  France .................. 73/430

*Primary Examiner*—Gene Mancene
*Assistant Examiner*—Mickey Yu
*Attorney, Agent, or Firm*—Eugene E. Renz, Jr.

[57] ABSTRACT

A damping system for damping relative rotation of a pair of members having confronting surfaces spaced apart by a primary gap or zone of capillary dimension, a viscous damping fluid in the gap contacting the confronting surfaces of said members and held in the gap by capillary attraction to provide a damping action upon rotation of the members relative to one another, the arrangement providing a non-migrating self-supporting viscous fluid damping system. In a preferred embodiment of the invention, the confronting surfaces of the members defining the capillary gap or zone are in non-parallel relationship, for example, one of the confronting surfaces may be planar and the other conical wherein the rotational axis of the rotatable member is disposed on the point of the cone to provide a point contact bearing minimizing friction and centering the viscous damping material adjacent the axis of rotation to provide a more uniform controlled damping action. Still another feature of the invention resides in the provision of a secondary capillary viscous fluid reservoir of slightly larger capillary dimension than the primary capillary zone between the members. The reservoir serves to replenish any fluid lost in the capillary zone due to evaporation for example, and eliminates the criticality of metering a precise amount of viscous fluid to the primary zone initially.

9 Claims, 19 Drawing Figures

U.S. Patent  May 11, 1982  Sheet 1 of 4  4,328,639
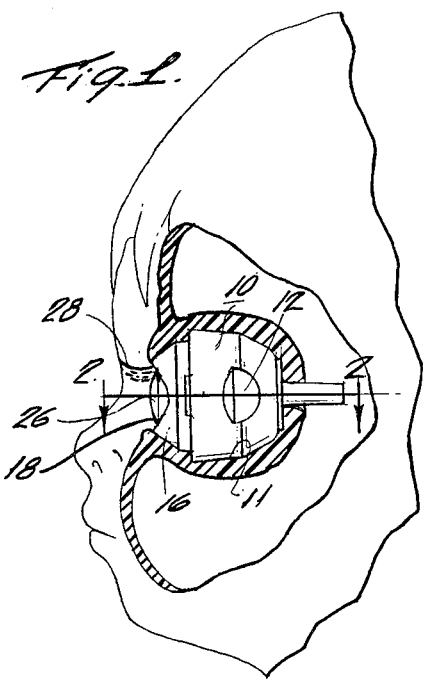
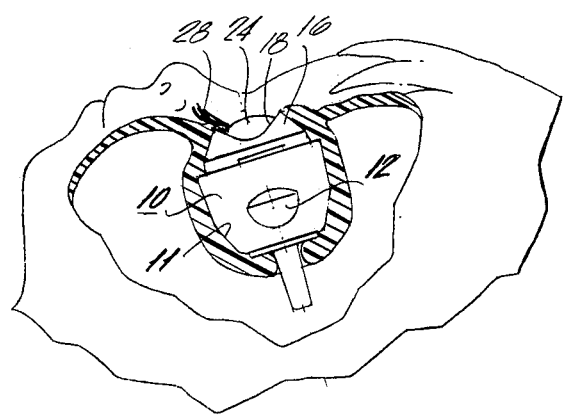
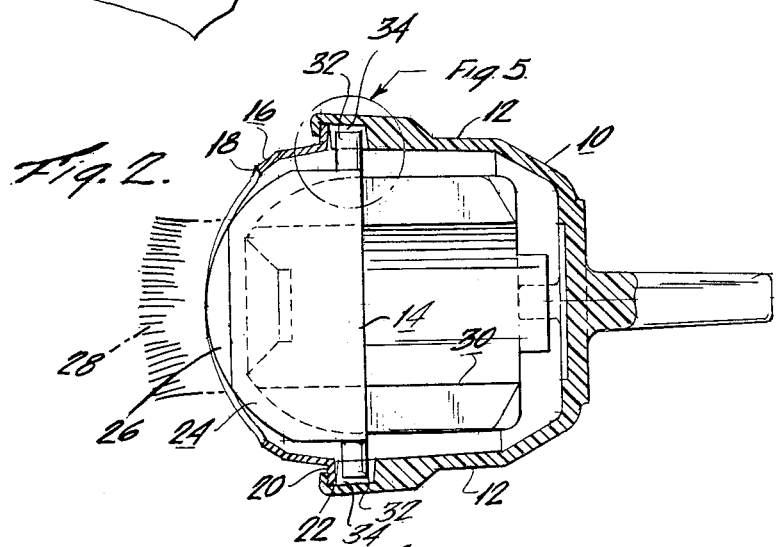
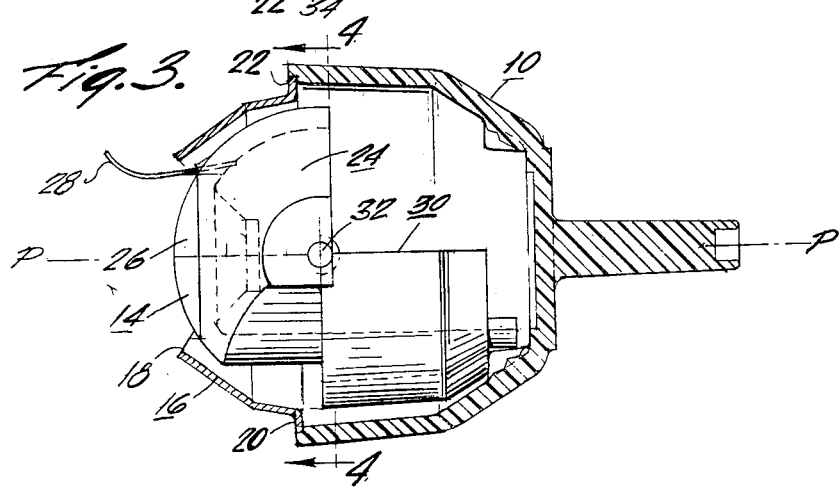

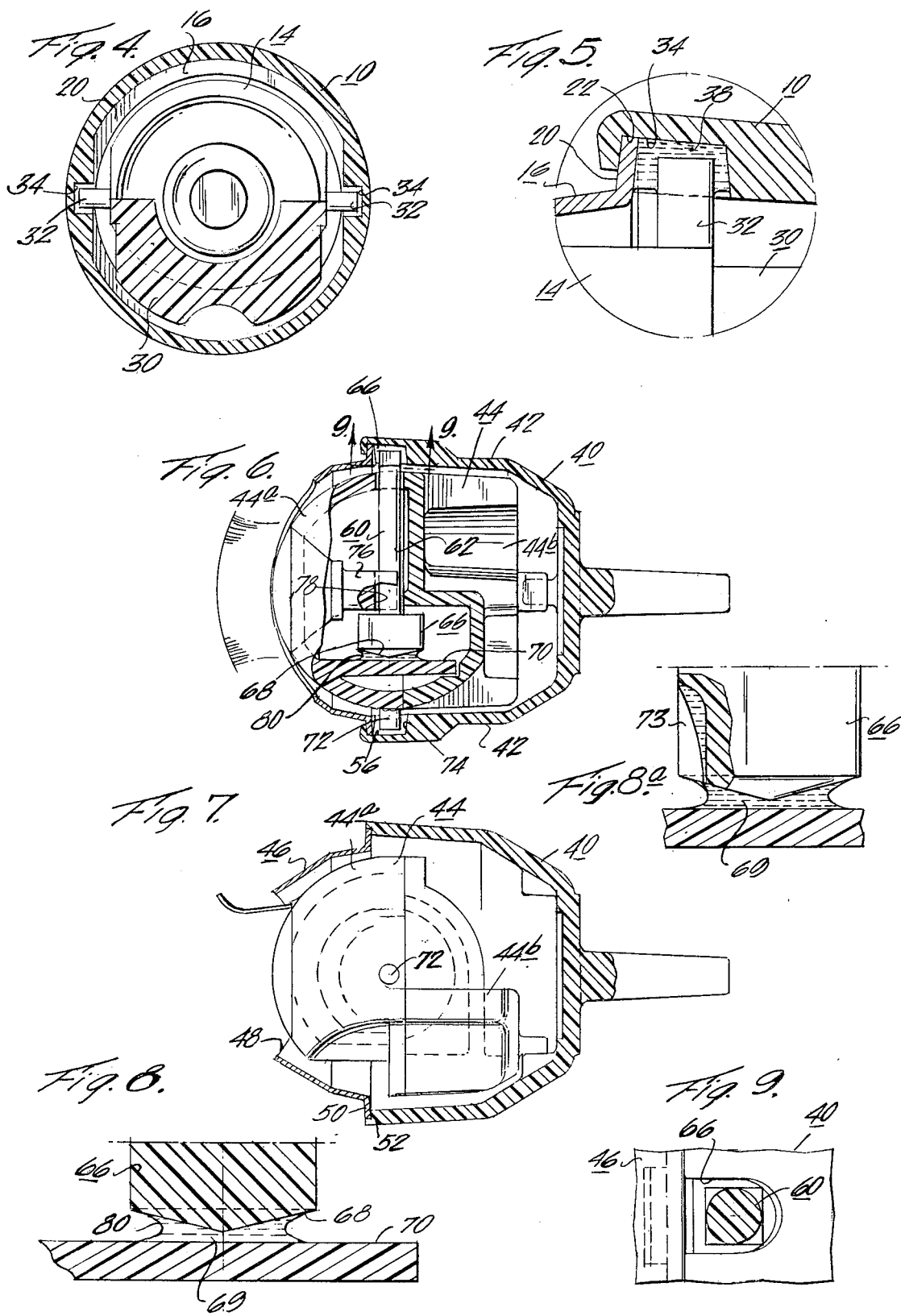

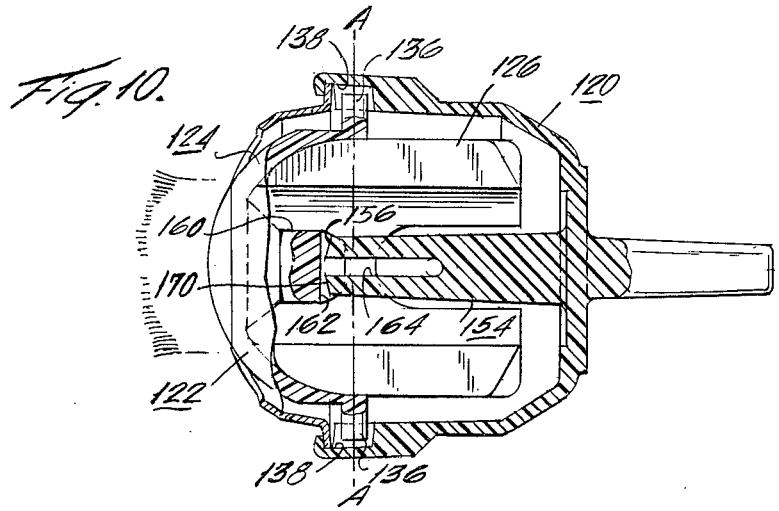
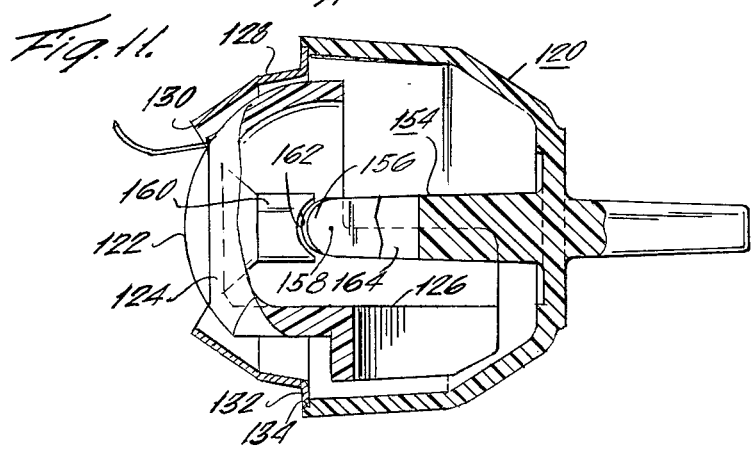
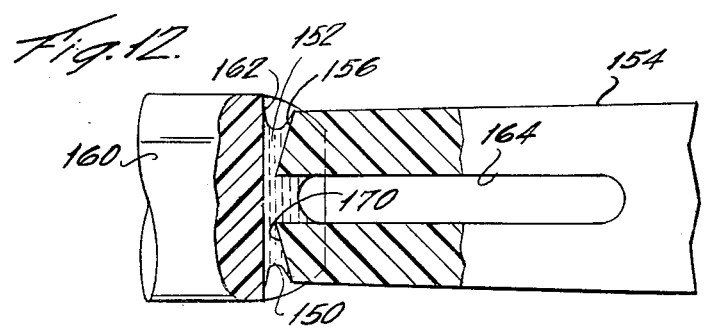
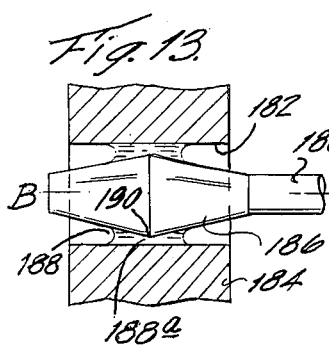
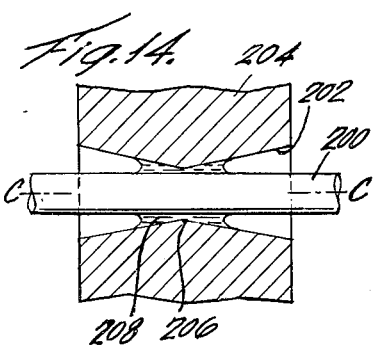
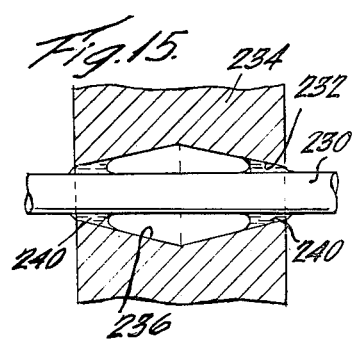

VISCOUS FLUID DAMPING SYSTEM

BACKGROUND OF THE INVENTION

The present invention relates to viscous fluid damping mechanism and more specifically to a novel doll eye assembly incorporating a viscous damping mechanism to control opening and closing movements of the doll eye. The damping device has particular application to eye assemblies for dolls and operates in a manner to produce a controlled uniform opening and closing movement of the doll in a very life-like manner.

The use of a viscous fluid as a damping means to control rate of angular movement of elements is not new per se. For example, this broad concept is disclosed in the Cotey U.S. Pat. No. 3,688,626 issued Sept. 5, 1972 and entitled VISCOUS GOVERNOR DEVICE. In this instance, the viscous governor device is utilized in a typical music box consisting of a rotatable picker drum having a plurality of picks projecting from its outer periphery at selected locations which engage spring fingers of a comb in a coordinated sequence to produce a particular musical composition. Rotation of the picker drum is controlled by a drive assembly including a hand windable coil spring and a detent mechanism for selectively effecting release of the spring and rotation of the drum when desired. The picker drum is hollow and has a chamber for a damping material such as silicone putty. A fixed paddle member is immersed in the damping material in the chamber, the combination producing a uniform drag on the picker drum when rotating. Even though my prior damping device is effective for the purposes intended, the damping arrangement does require a relatively large quantity of viscous material and must be housed in a closed system to prevent migration from the chamber.

SUMMARY OF THE INVENTION

The principle of the present invention resides in providing a small quantity of viscous damping material in the capillary zone or gap between the confronting surfaces of two relatively rotatable members. The capillary attraction of the viscous damping fluid on the confronting surfaces provides a controlled uniform damping action and even if the members are mounted for longitudinal movement relative to one another, the capillary attraction determines the proper capillary gap which is such that the capillary attraction forces exceed the gravity forces on the liquid. This arrangement, therefore prevents migration of fluid from the capillary zone. The capillary forces draw the members together and determine the proper capillary gap or zone and, therefore, the relatively rotatable parts may be designed within relatively wide tolerance ranges which simplifies manufacture and assembly.

The confronting surfaces of the members in the capillary zone preferably lie in different planes. For example, one surface may be planar and the other conical which provides more contact area for the same projected area and, therefore, an increase in the total capillary attraction forces between the members. Coning the surface, therefore, serves to amplify the capillary attraction forces without increasing the projected size of the contact areas. The arrangement also maintains the surfaces at a predetermined capillary gap or zone to obtain consistent damping action and provides a point contact bearing surface which minimizes friction for more consistent control of the damping action by the viscous damping fluid. By maintaining the surfaces apart, the capillary attraction of the fluid prevents migration and, therefore, consistent damping. The arrangement of the point at the axis of rotation also localizes the viscous damping fluid and centers it in relation to the axis of rotation for more uniform damping action.

Another feature of the invention is the provision of a fluid reservoir in at least one of the members which communicates with the capillary gap and is itself of a capillary dimension. By this arrangement, if there is migration of fluid from the gap due to fluid evaporation loss or through accidental leaching, the reservoir fluid feeds to the gap to maintain a uniform quantity of viscous fluid in the capillary gap. By the reservoir arrangement, a quantity of viscous material greater than is actually needed to fill the primary capillary gap may be metered and the excess stored in the reservoir to replenish the gap when needed.

Even though the present invention has broad applications, it is particularly adapted for moving doll eye assemblies which typically consist of a housing and an eyeball assembly which is mounted for pivotal movement in the housing on stub shafts which seat in complementary pockets or journals in the housing. In these applications, a small quantity of the viscous fluid is placed in the journal pockets which provides a controlled angular movement of the eyeball in the housing when the doll is moved through different angular positions. Apart from the desired functional effect produced by the damping device, the overall assembly is comparatively simplified and economical to produce or manufacture.

Accordingly, it is an object of the present invention to provide a non-migrating viscous fluid damping device for controlling angular movements of relatively rotatable elements which is of simplified construction and provides for accurate uniform control of angular rate of movement of the members relative to one another.

A further object of the present invention is to provide a damping system wherein the surfaces of the members in the capillary zone are of a predetermined configuration to support a predetermined small quantity of a viscous damping material in a capillary gap or zone between the confronting surfaces to provide a uniform controlled damping action upon relative rotation of the members.

Still another object of the present invention is to provide a damping system wherein the confronting surface of one member is planar and the other confronting surface is conical with the point located at the axis of rotation thereby to localize the damping fluid to the area of the axis of location for better damping control.

Still another object of the present invention is to provide a damping system including a secondary capillary fluid reservoir of slightly greater or larger capillary dimension than the primary capillary zone or gap between the members which serves to feed viscous damping material to the primary capillary zone in the event of evaporation or loss of fluid from said zone.

Still another object of the present invention is to provide a damping system wherein the viscous fluid mass in the primary capillary zone is essentially symmetrical relative to the rotational axis of the members and drag or damping force of the viscous fluid is substantially uniform.

These and other objects of the present invention and various features and details of the operation and construction thereof are hereinafter more fully set forth with reference to the accompanying drawings.

DESCRIPTION OF THE DRAWINGS

FIG. 1 is a side elevational view partly in section of a doll eye assembly incorporating damping means in accordance with the present invention;

FIG. 1a is a view similar to FIG. 1 showing the eye in a closed position;

FIG. 2 is a top plan view partly in section of the doll eye assembly;

FIG. 3 is a side elevational view of the doll eye assembly partly in section;

FIG. 4 is a sectional view taken on lines 4—4 of FIG. 3;

FIG. 5 is an enlarged view of the portion circled in broken lines in FIG. 2;

FIG. 6 is a top plan view partly in section of another embodiment of doll eye assembly incorporating a damping system in accordance with the present invention;

FIG. 7 is a side elevational view thereof with the housing in section;

FIG. 8 is an enlarged fragmentary sectional view showing the elements comprising the damping system;

FIG. 8a is a view similar to FIG. 8 showing a modification incorporating the secondary capillary reservoir;

FIG. 9 is an enlarged sectional view taken on lines 9—9 of FIG. 6;

FIG. 10 is a top plan view partly in section of still another embodiment of doll eye assembly incorporating a damping system in accordance with the present invention;

FIG. 11 is a side elevational view thereof partly in section;

FIG. 12 is an enlarged fragmentary view partly in section showing the elements comprising the damping system; and FIGS. 13, 14 and 15 are fragmentary sectional views showing further embodiments of damping arrangements in accordance with the present invention.

DESCRIPTION OF PREFERRED EMBODIMENTS

Figure 9A:
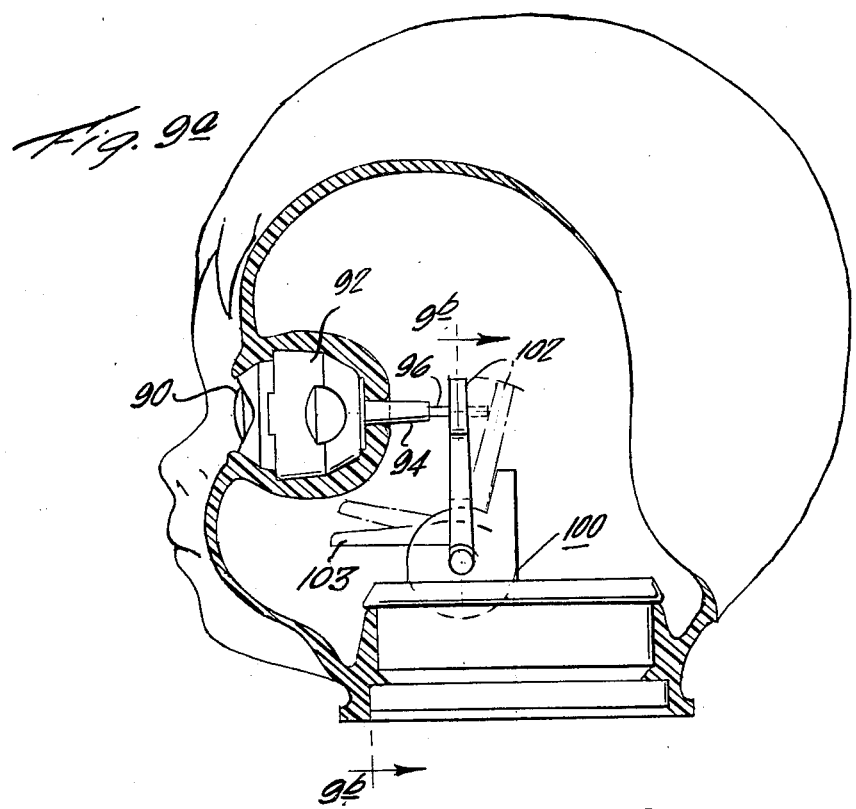
FIGS. 9a and 9b are views of another embodiment of damping mechanism in accordance with the present invention.

Referring now to the drawings and particularly to FIG. 2 thereof there is illustrated a single doll eye assembly incorporating damping means in accordance with the present invention. The doll eye assembly is of generally standard construction and comprises a cup-like housing 10 adapted to seat in a socket opening 11 in the head of a doll. An eyeball 14 is mounted in the housing 10 and is adapted for pivotal movement in the housing. The eyeball 14 is held in the housing 10 by means of a cover 16 having an oval shaped opening 18 and a peripheral flange 20 which snap fits into an annular groove 22 formed in the front wall of the housing defining the opening therein. The eyeball includes a semi-spherical forward section 24 including the pupil 26 and lashes 28, a weighted rear section 30 projecting from the semi-spherical portion of the eye and a pair of stub shafts 32 which seat in diametrically opposed journal pockets 34 in the housing. The weighted rear section 30 is located below a horizontal plane P—P through the eyeball on which the stub shafts are located so that when the housing is located in a horizontal position, the eye is in a fully open position. This, of course, is the position of the doll when it is in a standing or an upright seated position. Now as the doll is moved to a prone position, and the housing is moved to a vertical position, the eyeball pivots in the housing and the eye rotates to a closed position. The assembly thus far described is conventional and the rate of opening and closing movement of the eye assembly is directly a function of the rate of movement of the doll from, for example, a horizontal to a vertical position; that is, the eye opens or closes rapidly if the doll is moved rapidly between these positions.

In accordance with the present invention, damping means is provided producing a uniform, controlled rate of movement of the eye assembly in the housing in a manner which may be characterized as a slow closing doll eye movement. This controlled angular movement at a predetermined rate is achieved by providing a predetermined quantity of a viscous damping fluid 38 in the journal pockets. A suitable viscous damping fluid for this purpose is silicone of a viscosity greater than 1,000,000 centistokes (c.s.). As illustrated, the fluid fills the capillary gap or zone between the confronting surfaces of the stub shafts and journal pockets and is retained in the pockets by capillary attraction to provide a drag or damping force during rotation of the eyeball between limit positions. The manufacture and assembly of doll eyes in accordance with the present invention is simple and economical. For example, a predetermined measured quantity of the viscous damping fluid 38 is simply metered into the journal pocket in the housing and thereafter the eyeball and cover are assembled in place in the usual manner.

There is shown in FIGS. 6-9 another embodiment of single doll eye assembly incorporating a damping arrangement of the present invention. As illustrated, the doll eye assembly includes a cup-shaped housing 40 adapted to seat in socket openings in the head of the doll. The assembly further includes a pivotally mounted eyeball 44 and a cover 46 with an oval-shaped opening 48 having a peripheral flange 50 which seats in a circumferentially extending groove 52 in the outer terminal edge of the housing. The eyeball 44 comprises a forward section 44a and a weighted rearward section 44b.

In the present instance, the damping system includes a damper arm 60 having an elongated shaft 62 which is mounted in a fixed non-rotatable position in the housing 40 and to this end the outer terminal end of the shaft has a flat which engages in a complementary slot 66 in one side of the interior of the housing. The damper arm has limited longitudinal movement. The damper arm mounts at its opposite end, an enlarged cyindrical projection 66 having a conical face 68 which confronts a planar surface 70 formed in the forward portion of the eyeball. The forward section 44a of the eyeball assembly mounts a stub shaft 72 which projects longitudinally from approximately the center of the opposite wall of the planar surface 70 and engages in a journal pocket 74 in the housing aligned with the fixed pivot of the damper arm. As illustrated in FIG. 6 the pupil of the eyeball assembly has a rearwardly projecting support member 76 with a slotted opening 78 to embrace the damper arm. In operation, therefore, as the housing is moved through various positions upon movement of the doll, the eyeball rotates in the housing and also relative to the damper arm. A viscous damping fluid 80 such as silicone is centered and held by capillary action between the planar surface 70 and conical face 68, the space defining a primary capillary zone 69. By this arrangement the capillary forces provide a damping action and the rotation of the eyeball is what may be characterized as slow moving and controlled. Note that in the present embodiment the elements comprising the damping system are completely enclosed in a housing structure 71 to prevent ingress of foreign matter to the primary capillary zone.

It is noted that in this instance, there may be a small amount of longitudinal play between the damper arm and eyeball in the housing allowing the capillary attraction of fluid forces to attract the confronting surfaces of the damper arm and eyeball to define the primary capillary gap or zone and provide continuous damping action. This eliminates the need for maintaining critical tolerances in the manufacture or assembly of the parts. Note also that the damping fluid is centered relative to the axis about which the parts rotate to provide a uniform damping action upon rotation of the eyeball.

FIG. 8a shows a modification wherein the projection 66 includes a secondary capillary reservoir defined by a slot 73 of slightly greater capillary dimension than the primary zone 69.

Figure 9B:
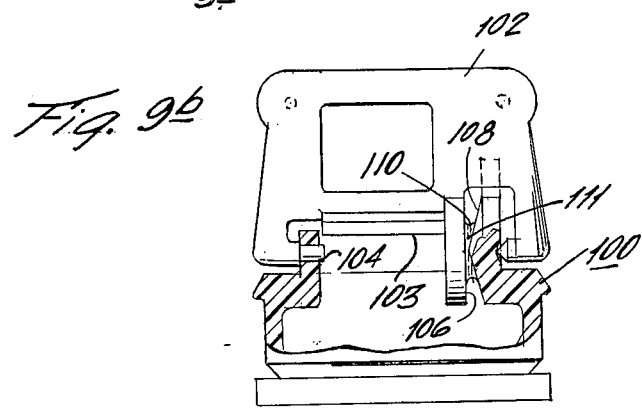

Still another embodiment of slow moving doll eye assembly incorporating a damping mechanism in accordance with the present invention is illustrated in FIGS. 9a and 9b. The damping principle is generally similar to that described above except that in the present instance the damping arrangement is shown in conjunction with a standard actuating assembly for controlling angular movement of both doll eyes by a single actuating unit. Thus, each doll eye is of conventional construction and includes a doll eye 90 mounted in a housing 92 which has an elongated rearward projection 94 and an actuating shaft 96 operable between an outer limit position, wherein the doll eyes are fully open and an inner limit position wherein the doll eyes are closed (see FIG. 9a). The actuating mechanism for moving both shafts simultaneously includes a damper unit housing 100, an actuating blade 102 engaging the actuating shafts for the eyes 96 and a counter weighted damper arm 103 pivotally mounted on the housing. The damper unit includes a planar section 106 which confronts a conical portion 108 of the housing. A viscous damping material 110 is held at the pivot of the cone-shaped section 108 of the housing and the flat surface 106 of the damper arm to provide the controlled uniform rotation of the damper unit relative to the housing and in turn the controlled uniform angular displacement of the eyes between open and closed positions. In this instance the capillary gap or zone 111 is fixed with the point of the conical surface 108 in close proximity to the planar surface 106.

The unit thus functions as a non-migrating viscous fluid damping device providing a uniform controlled angular rate of movement of the damper arm about a pivot axis to actuate the eyes in a smooth controlled manner between open and closed position.

Still another embodiment of doll eye assembly incorporating a viscous damping arrangement of the present invention is illustrated in FIGS. 10, 11 and 12. The doll eye assembly is somewhat similar in overall construction and arrangement to that previously described and includes a cup-like housing 120, a doll eye assembly 122 pivotally mounted in the housing consisting of a semi-spherical forward section 124 and a counter weighted rear section 126 and a cover element 128 with an oval-shaped opening 130 therein which has a circumferentially extending flange 132 which seats in a groove 134 in the outer end of the housing in the manner illustrated. The eyeball 122 has a pair of diametrically opposed stub shafts 136, 136 projecting therefrom located at the juncture of the forward and rearward sections which seat in journal pockets 138, 138 in the open end of the housing.

In accordance with the present invention damping means consisting of a viscous damping fluid 150 in a zone or gap 152 of a capillary dimension between relatively rotatable elements of the doll eye assembly is provided to effect a slow moving, damped action of the eye assembly relative to the housing. In the present instance, the damping arrangement consists of a blade-like projection 154 formed integrally with the housing which in side elevational view has a semi-spherical tip 156, the center 158 of which is illustrated, is aligned with the axis of rotation A—A of the eye assembly in the manner illustrated in FIG. 10. The pupil mounts a rearwardly projecting post 160 having an arcuate face 162 conforming to the peripheral trace of the tip of the blade and spaced therefrom to define the capillary zone or gap 152. The capillary attraction between the confronting arcuate surfaces provides the damping action upon rotation of the eye assembly about the pivot axis when, for example, the doll is moved between a vertical and a horizontal position. Note also that by this arrangement the capillary zone or gap 152 remains of substantially constant dimension during actuation of the eye assembly between extreme limit positions. The damping arrangement also includes a viscous fluid reservoir, in the present instance, in the form of a slot 164 in the post member which opens into the capillary gap or zone 152 and is of a predetermined cross section of a capillary dimension smaller than the capillary gap or zone between the blade and post. The tip of the blade is bevelled as at 170 to define a capillary gap which widens on either side of the central part of the zone. The taper is preferably no greater than an angle of 10° to 15° to the axis A—A. The viscous fluid reservoir serves to replenish the fluid in the capillary gap in the event of evaporation of fluid. The reservoir also eliminates the need to meter a precise quantity to the gap to achieve the desired damping action.

Even though the viscous fluid damping concept of the present invention has been illustrated and described in connection with doll eye assemblies, the invention has other broader applications wherein the damping principles are utilized to control relative movement of parts of other mechanisms in a controlled manner. For example, the invention may be utilized as a precision escapement for spring powered devices, i.e. timing devices, clocks, etc., and as a damping means for instrumentation such as analog gauges, etc. Several typical fluid damping arrangements are illustrated in FIGS. 13, 14 and 15.

In FIG. 13 the principle is shown as applied to a shaft member 180 which at one end is journalled in a cylindrical opening 182 in a fixed housing 184 or the like. The shaft 180 has a double cone configuration 186 at its terminal end which is journalled in the opening in the housing to provide an annular capillary gap or zone 188 which has a narrow throat area 188a adjacent the apex 190 of the cones and diverges outwardly from the apex. The cones are preferably tapered in opposite directions relative to one another at an angle of between 10° and 15° to the axis B—B of the shaft. By this arrangement, a viscous damping fluid such as silicone is centered and held by capillary attraction in a zone and is centered on either side of the point of the cone and the cylindrical surface which it confronts. This arrangement also provides a line or point contact bearing which maintains the frictional forces between the shaft and the housing at a minimum and thereby provides a more uniform drag force or damping action by the viscous fluid.

FIG. 14 shows a further embodiment of damping system in accordance with the present invention for a shaft 200 which is rotatable in an opening 202 in a fixed housing 204. In this instance, the shaft 200 is of uniform cross section and the opening in the housing is of double conical configuration converging at an apex point 206 which defines the minimum cross sectional area of the capillary zone 208. The tapers are preferably in the order of between 10° and 15° to the axis C—C of the shaft. FIG. 15 shows a modification of the damping system described and again includes a rotatable shaft 230 of uniform cross section which engages in an opening 232 in a fixed housing 234 or the like. In this instance, the double conical configuration 236 of the opening in the housing diverges inwardly toward the center to provide two capillary zones 240 adjacent opposite walls of the housing. These embodiments may also incorporate a viscous fluid reservoir which may comprise either axially extending slotted openings in the confronting surfaces of the shaft and housing or a peripheral groove in the housing adjacent the apex of the conical sections of the shaft. These slots or grooves are of a capillary cross section slightly greater than the largest cross section of the primary capillary gap or zone. In this manner, when the viscous fluid is initially introduced, it first fills the primary capillary gap or zone and any excess flows into the reservoir capillary and thus eliminates the need for metering a precise quantity to the gap to achieve the desired damping action. Likewise the reservoir serves to replenish any fluid in the capillary zone which may be lost through evaporation.

What is claimed is:

1. A doll eye assembly comprising a housing, an eyeball pivotally mounted in said housing, a projection formed in said housing having a semi-sperical tip portion, the center of which is aligned with the axis of rotation of the eyeball, said eyeball including a portion having an arcuate face conforming to the peripheral trace to the tip of the housing projection and spaced therefrom to define a first capillary zone, a viscous fluid damping material in said first capillary zone providing a damping action upon rotation of the eyeball about the pivot axis and means defining a secondary capillary reservoir in fluid communication with said first capillary zone and of greater capillary dimension than the greatest cross-section of said first capillary zone.

2. A doll eye assembly comprising a housing, an eyeball pivotally mounted in said housing, said pivotal mounting including a pair of stub shafts projecting from said eyeball at diametrically opposed locations and engaging in a pair of pockets in the housing, said shafts and housing having arcuate surfaces spaced apart to provide a first capillary zone and a viscous fluid damping material held in said first capillary zone by capillary attraction and being the sole means for controlling pivotal damping movement of said eyeball relative to said housing.

3. A doll eye assembly comprising a housing, an eyeball pivotally mounted in said housing, said pivotal mounting including a non-rotatable shaft member having a conical face at one end confronting a planar surface of said movable eyeball, a small quantity of a viscous fluidic damping material in a primary capillary zone between the said conical face and planar surface thereby to control and damp angular movement of said eyeball in said housing.

4. A doll eye assembly as claimed in claim 3 including a secondary capillary reservoir in fluid communication with said primary capillary zone.

5. A doll eye assembly as claimed in claim 4 wherein the capillary dimension of said reservoir is greater than the greatest cross section of said primary zone.

6. A system for damping at least a pair of members mounted for movement relative to one another, said members have confronting surfaces defining a first capillary zone therebetween, a viscous fluid damping material in said first capillary zone and supported therein by capillary attraction, and a second capillary reservoir in one of said members adjacent said first capillary zone, said secondary capillary reservoir in direct fluid capillary communication with said first capillary zone and being of greater capillary dimension that the greatest cross-section of said first capillary zone providing means for drawing excess fluid from said first capillary zone by capillary action, the viscous material in said first capillary zone being essentially the sole means damping movement between said members, said secondary reservoir thereby providing means for achieving predetermined substantially uniform damping action.

7. A system as claimed in claim 6 wherein the surfaces defining said primary capillary zone are in non-parallel relationship.

8. A system as claimed in claim 6 wherein one of said surfaces is planar and the other is conical and said viscous damping material is distributed uniformly about the apex of said conical member.

9. A system as claimed in claim 6 wherein one of said members has a conical face confronting a planar surface of said other member in the first capillary zone thereby to provide a point pivot arrangement between said members.

* * * * *